United States Patent [19]

Westmoland

[11] 4,034,164

[45] July 5, 1977

[54] CITIZENS BAND CARTRIDGE FOR TAPE DECKS

[76] Inventor: Randy C. Westmoland, Box 92, Skiatook, Okla. 74070

[22] Filed: Aug. 25, 1975

[21] Appl. No.: 607,184

[52] U.S. Cl. ............................ 179/100.11; 325/16; 325/102; 325/311; 360/137

[51] Int. Cl.² ........................................ G11B 31/00

[58] Field of Search .............. 179/100.11; 325/311, 325/312, 16, 102; 360/137

[56] References Cited

UNITED STATES PATENTS

| | | | |
|---|---|---|---|
| 3,582,965 | 6/1971 | DeMetrick | 179/100.11 |
| 3,645,540 | 2/1972 | Tanaka et al. | 179/100.11 |
| 3,700,826 | 10/1972 | O'Neal | 179/100.11 |
| 3,917,372 | 11/1975 | Selinko | 179/100.11 |
| 3,991,369 | 11/1976 | Fujimoto | 325/102 |

OTHER PUBLICATIONS

*Automatic Radio*, 1968, Catalog, Model MBC-6248 and TRE-6500.

*Primary Examiner*—Raymond F. Cardillo, Jr.
*Attorney, Agent, or Firm*—Head, Johnson & Chafin

[57] ABSTRACT

A cartridge type radio transceiver for citizen band radio reception and transmission, adapted for free standing use at any location, and use as a cartridge inserted into a conventional cartridge tape deck. The transceiver cartridge includes a transmitter and receiver which may be of conventional design, housed in a housing which comprises two parts, a first part insertable into the tape deck, and the other part extending forwardly of the tape deck. Microphone-loud speaker means are provided, and means for an attachment of a radio antenna. Contact means are provided for contacting conventional contact means inside of a cartridge tape player, to provide power for powering the transceiver and including magnetic transducer means for inducing receiver audio output signals into the magnetic head means of the tape deck so that said signals can be amplified and played out through the speaker means attached to the tape deck.

8 Claims, 8 Drawing Figures

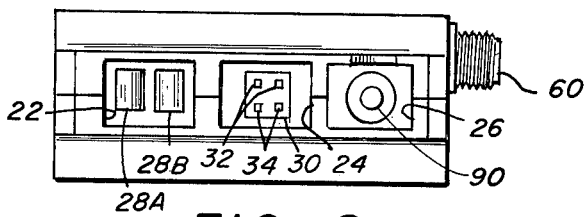
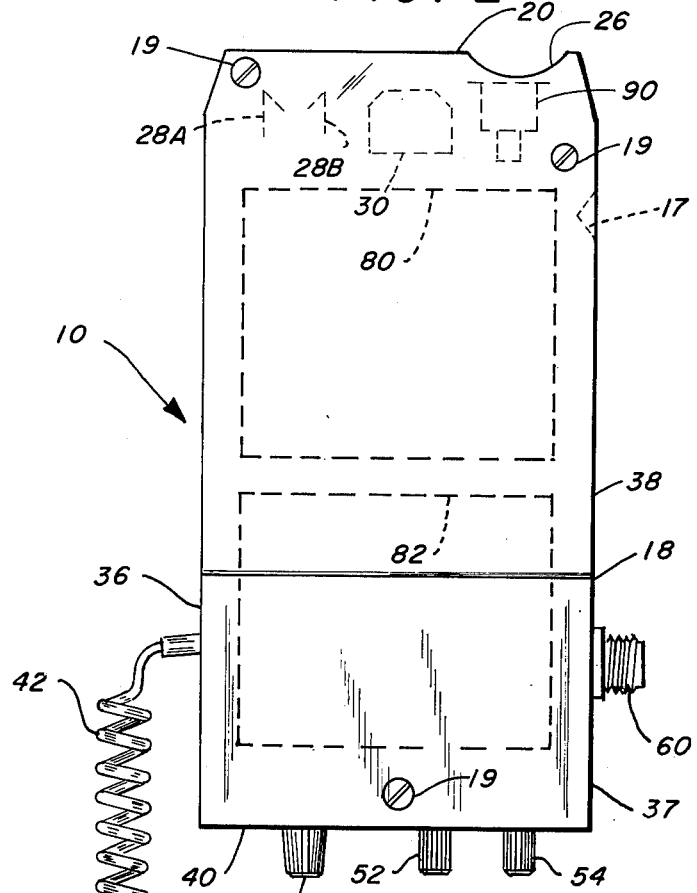
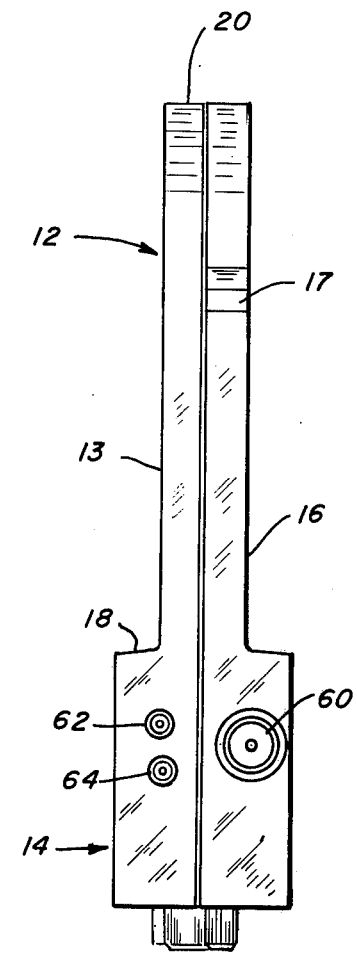
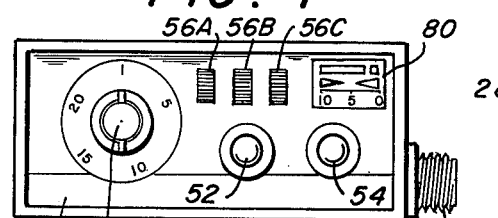
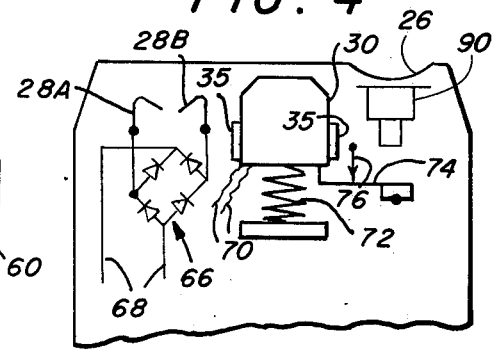
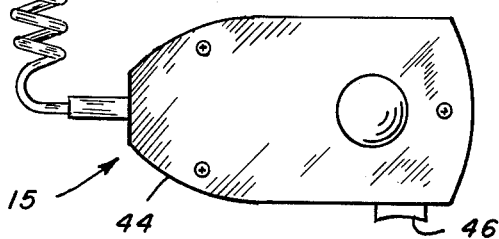

CITIZENS BAND CARTRIDGE FOR TAPE DECKS

BACKGROUND OF THE INVENTION

This invention lies in the field of portable radio transceiver devices. More particularly, it concerns a low power transceiver, such as used in the citizen band radio transceivers, adapted to be used as a free standing system when supplied with battery power and antenna, or alternatively used as a radio cartridge to be inserted into a tape cartridge player.

In the prior art, there are a number of models of conventional tape cartridge decks, or players, which are mounted in vehicles or in other locations and are supplied with appropriate power and loud speakers, etc.

There are also radio receivers which have been designed within the confines of a cartridge shaped housing, which can be inserted into and played out through the conventional tape decks. However, there has heretofore not been any device comprising a radio transmitter and receiver, which is adapted as a cartridge to be inserted into a conventional cartridge type tape player, and to utilize the power and the loud speakers of said player. Said radio transmitter and receiver also being adapted to be supplied with a separate battery power supply and to be used as a freestanding transceiver instrument.

SUMMARY OF THE INVENTION

It is a primary object of this invention to provide a design of transceiver instrument which can be inserted into a conventional cartridge tape deck and to utilize the power from the loud speaker means of said tape deck, so that by simply attaching an antenna to the transceiver cartridge, the transceiver may be used in conjunction with the tape deck. It is a further object to provide means so that when the transceiver cartridge is removed from the tape deck and a simple battery power supply attached the transceiver can be used at any location distant from the tape deck.

It is a still further objective to provide a receptacle for the transceiver cartridge which supplies both power and antenna for the transceiver while operating outside of the conventional cartridge tape deck.

These and other objects are realized and the limitations of the prior art are overcome in this invention by utilizing a transceiver which is housed in a special housing which comprises two parts: one part of a shape and size adapted to be inserted into a conventional cartridge tape deck, and the other part designed of such dimensions as are appropriate for the housing of the transceiver. Means are provided on the cartridge by simple insertion of the cartridge, to take power from the tape deck and to transduce audio signals from the radio receiver through the magnetic recording head into the tape player loud speaker system. Microphone/loudspeaker means are provided for the transmitter, and means are provided for attachment of an appropriate antenna. In addition, means are provided for separately supplying appropriate battery pack to power the transceiver when the cartridge is removed from the tape deck. Thus it is possible to use the transceiver cartridge either in a mounted tape deck, utilizing the power and loud speakers of the tape deck, or the transceiver cartridge can be used as a freestanding system by supplying battery power separately, such as with the transceiver receptacle.

BRIEF DESCRIPTION OF THE DRAWINGS

These and other objects and advantages of this invention and a better understanding of the principles and details of the invention will be evident from the following description taken in conjunction with the appended drawings in which:

FIGS. 1, 2, 3, and 4 illustrate four views of the apparatus of this invention.

FIG. 5 illustrates internal details of the apparatus.

DESCRIPTION OF THE PREFERRED EMBODIMENT

Figure 6:
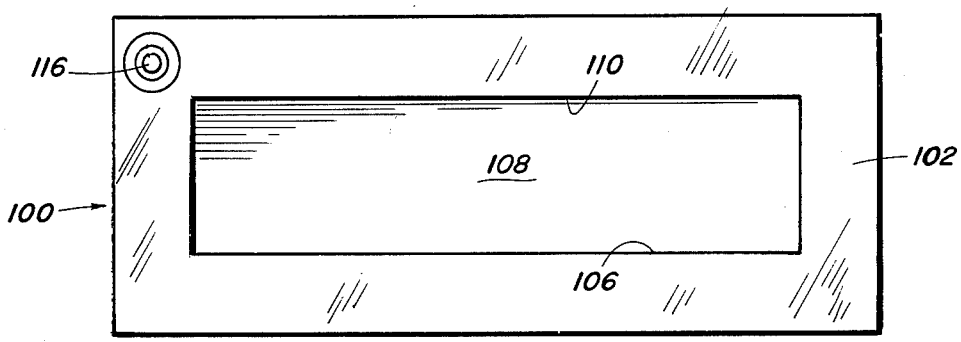
FIGS. 6, 7 and 8 illustrate three views of the transceiver cartridge.

Referring to the drawings, the preferred embodiment of this invention comprises an instrument cartridge indicated generally by the numeral 10. This has two portions, a cartridge portion 12 and a first portion 12 and a second portion 14. There is a microphone/loud speaker indicated generally by the numeral 15, which is connected by multi-conductor cord 42 to the portion 14 of the apparatus.

The housing comprises two parts, 13 and 16, which are fastened together by means such as screws 19, for example. The shape of the first portion 12, from the end 20 to the point 18, at which the enlarged dimensions of the part 14 starts, is of such a shape and size as to fit the opening in a conventional cartridge type tape player, or tape deck. The dimensions of the second part 14 are adjusted to provide sufficient additional space to house the transceiver with appropriate controls.

The dashed lines 80 and 82 represent schematically, respectively, the circuit boards on which are mounted the radio reciever and the radio transmitter of the transceiver. No detail need be provided of the receiver and transmitter parts of the transceiver, since they are conventional in all respects.

In the conventional tape deck adapted for using cartridges, there are two contacts which are adapted to press on the face of the magnetic tape and on appropriate conducting material on the tape, to generate an appropriate signal in the tape deck. These two contacts are useful for supplying power to the transceiver deck, and two contacts, 28A and 28B, are provide opposite a first opening 22 in the end 20 of the portion 12. These contacts are in such a position that the conventional contacts in the tape deck will make contact with the contacts 28A and 28B, and provide power into the transceiver cartridge. In general, the power will be a voltage of conventional magnitude and ground, since there is no convention among the various manufacturers of tape decks as to the polarity of the voltage on their contacts. A diode bridge 66 is connected to the contacts 28A and 28B to provide output leads 68 which have a fixed polarity, and may be used to supply power to the transceiver. No detail of the connection between the power leads 68 and the transceiver circuits are necessary, since any man skilled in the art of radio transceivers will understand how the power connections can be made to the radio circuits.

There is a second opening 24 in the end 20 of the portion 12 of the transceiver cartridge. Opposite this opening 24 is an assembly 30 which comprises an insulating block inside of which are a pair of U shaped magnetic cores having appropriate leads 70. These cores show at the outer face of the block 30 as pairs of magnetic legs 32 and 34. These ends of the magnetic cores are adapted to press against the magnetic head which is mounted inside of the tape deck and normally is adapted to press against the magnetic tape to read the magnetization thereon. However, when the legs 32 and 34 are appropriately pressed against the two recording head and appropriate analog signals are provided on the leads 70, a magnetic field will be induced into the magnet structure of the head and currents will be induced in the head coils which are normally connected to amplifiers and loud speakers, etc. Therefore, the analog audio signals from the radio receiver are connected to the lead 70 which go to the magnetic cores 32 and 34 and by this means the output of the radio receiver, in the form of audio frequency signals, can be transduced into the head and into the loud speaker system connected to the tape deck.

There is a third opening 26 in the end 20 of the transceiver deck 10. This opening is to permit the tape drive wheel which is mounted in the side of the tape deck to move into the outer contour of the deck of the cartridge as it would do in a conventional tape cartridge. No contact is made with the drive wheels since there is no tape involved in this cartridge. However, the cutaway portion must be made in order to clear that wheel.

There is a detent 17 on the side 38 of the cartridge, which cooperates with a tension roller in the tape player to hold the cartridge in the player, as is provided for tape cartridges.

In FIG. 3, there is shown the front panel 48 of the transceiver with appropriate channel switch 50 and controls 52 and 54 for output volume and squelch, or other filtering system. Other means for turning or filtering, such as switches 56A, 56B, 56C can be provided. These can be used, for example, for public address switch, automatic noiselimiter, panel illumination, etc. Multipurpose indicator or meter 80 is provided for indicating battery condition, RF output, signal strength, or other appropriate information. Such controls are common for transceivers and no inventive details are involved in the controls for the transceiver.

As shown in FIG. 4 on the side 38 of the transceiver deck, there is shown an appropriate antenna connector 60 to which the broadcasting antenna would be connected. There are also shown two jacks 62 and 64. One can be used for the battery pack whenever the device is to be used away from the tape deck. The second jack can be used for an earphone or for a remote loud speaker as desired.

The microphone/loud speaker unit 15 comprises a housing 44 inside of which is a conventional microphone/loud speaker, which serves as a microphone, when the button 46 is pressed, which connects the microphone to the radio transmitter. When the push button 46 is released, it connects the audio output of the receiver to a loud speaker device in the housing 44. If desired, the loud speaker and the microphone can be the same physical unit which is used in one case to generate the signals by impressing audio pulsations, and in the second case to generate audio pulsations by passing a current through the coil.

The connecting cord 42 is conventional, and may have a plurality of conductors. Some of these conductors would be used to connect to the microphone and to the loud speaker, and to the switch 46. It is customary in transceiver work to apply a control voltage to the switch 46, which powers a relay inside of the transceiver which switches the transceiver to transmit mode as the button is pressed, and to receive mode when the button is released. None of the details of the microphone and loud speaker and switching form part of this invention, and, since they are generally well-known and understood by a man skilled in the art no further detail is provided.

As shown in FIG. 5, the transducer 30 which transduces audio signals from the leads 70 into the magnetic head system is mounted in a slide between guides 35 so as to slide longitudinally. It is backed by a spring 72 so as to be extended outwardly. Therefore, when the transceiver cartridge is pressed into the tape deck, the transducer 30 will press against the magnetic head in the deck with a force corresponding to the spring pressure 72. There are a pair of contacts 74, 76 which are opened whenever the transducer 30 moves back under the force of contact with the head. The purpose of the contact 74, 76 is to disconnect the loud speaker in the microphone/loud speaker unit 15. This disconnection is made only when the transceiver cartridge is inserted into the tape deck and the loud speakers of the tape deck are available.

A leaf spring contact 74 presses against fixed contact 76. The free end of the leaf spring contact is also in line with the transducer 30. When the transceiver is not in the tape deck, the spring 72 presses the transducer to its outermost position, and the contacts 74, 76 remain closed, and the loud speaker in the microphone/loud speaker unit is connected through contacts 74, 76 to the radio output in the transceiver. When the transceiver is inserted into the tape deck, the contact of the magnetic head of the tape deck pressing on the transducer 30 will cause it to move back from its outermost position, and in doing so, press on the spring contact 74, opening the circuit through contact 76, disconnecting the loud speaker in the microphone/loud speaker unit 15.

In FIGS. 1, 2, and 5 there are shown in dashed and solid line form an antenna jack 90 which is mounted inside of the transceiver cartridge 10. This is for use in conjunction with the transceiver cartridge receptacle, to be described in connection with FIGS. 6, 7, and 8.

Figure 7:
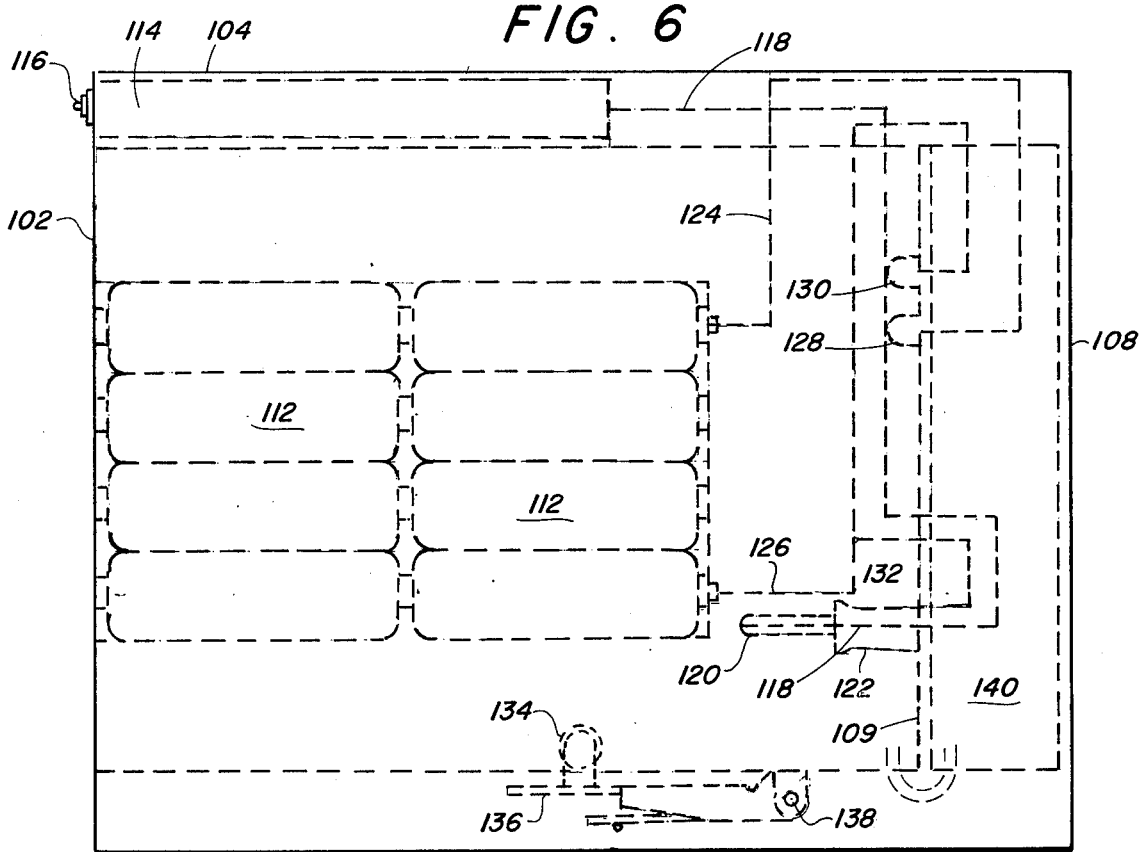
Figure 8:
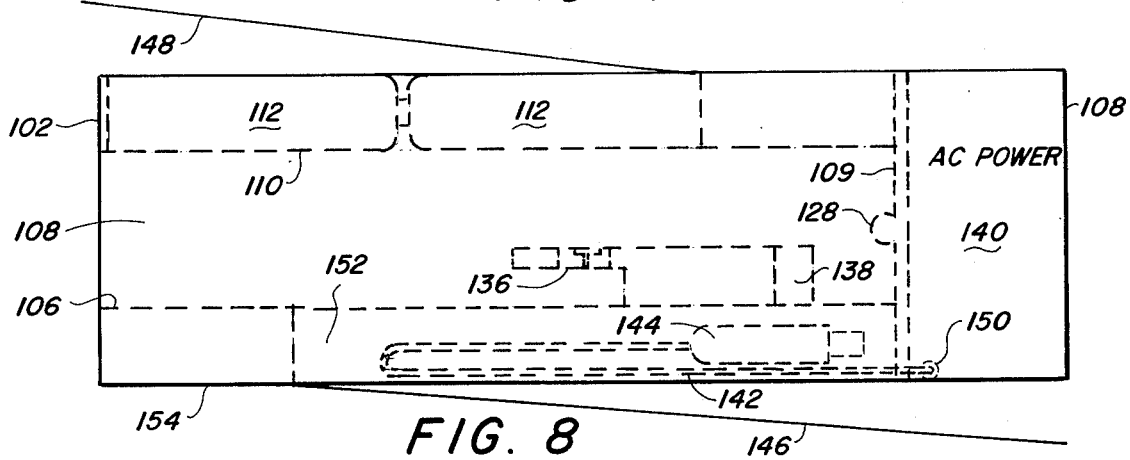

Referring now to FIGS. 6, 7, and 8 there are shown three views of a cartridge transceiver receptacle 100 which comprises a box or housing having an opening 108 into which the cartridge transceiver of FIGS. 1, 2, 3, 4, 5 can be inserted. This cartridge receptacle provides means for automatically connecting a power supply to the transceiver. The receptacle also contains an extensible antenna 116, which is connected to a plug 120, 122 on the inside of the receptacle opening 108, so that when the transceiver cartridge is inserted into the opening 108, there is automatic connection between the antenna plug inside the receptacle. Thus, the antenna which is part of the receptacle now becomes the antenna for the transceiver. Also, self-contained batteries are provided in the receptacle, as power for the transceiver, so that the combination of the receptacle and the transceiver provides a free-standing system with its own batteries and antenna, for citizen's band two way communication.

The receptacle 100 comprises a rectangular housing or box shown in front view in FIG. 6. This has a rectangular opening 108 with walls 106, 110, etc. of such dimension that the small end of the transceiver cartridge can be inserted into the opening 108. Shown in FIG. 8, which is a view taken from the side, with all internal parts shown in dashed outline. There is the internal space 108, shown with walls 106, 110 etc. defining the space 108. On the back wall 109 of the space 108 there are shown schematically two electrical contacts 130 and 128, which are connected to a power supply, such as the batteries 112, which are provided in a shallow space between the upper wall 110 of the space 108, and the top cover plate 148, through which access is made to the batteries. The contacts 130 and 128 are adapted to make contact with the flexible metal contact 28A and 28B of the transceiver shown in FIGS. 1 and 5. Lead 124 of the battery goes to contact 128, and lead 126 of the battery goes to corresponding contact 130. Lead 126 also serves as a local ground and lead 132 connects to the grounding shield of the antenna receptacle antenna plug 122. The antenna 114, 116, is a type comprising a plurality of nested tubes shown in front view as 116 in FIG. 6. By pulling out the nested tubes, the antenna can be extended to any desired length. The lead 118 from the antenna goes to the insulated prong 120 of the antenna plug 122.

In the space 140 against the back wall 108 of the housing, is a transformer and rectifier system which is commonly used to provide suitable power for a small radio transmitter/receiver such as that in the transceiver. There is a cord 142 and plug 144 connected onto the AC power box 140 through the opening 150. The plug 144 can be plugged into a conventional house power receptacle, and the transformer and rectifier in the unit 140 can be used to provide a suitable DC voltage, and/or can be provided to recharge the batteries 112 if they are the rechargeable type. The cord and plug 142, 144 are housed in a small space 152 which is adjacent to the bottom wall 154 of the housing. The cord and plug are available through a cover plate 146 as shown in FIG. 8.

In FIGS. 7 and 8 are shown two views of a detent mechanism which includes a roller 134 and a spring means 136, rotatable about a post 138. The purpose of the spring supported roller 134 is to fall into the notch 17 on the side of the transceiver, so as to lock it into position once the transceiver has been inserted into the space 108. This detent mechanism forms no part of this invention and is similar to that used in conventional magnetic cartridge tape players.

In summary, this invention involves a transceiver cartridge which is adapted to be used in three ways. A first way is in conjunction with a magnetic tape cartridge deck wherein the housing of the transceiver deck is inserted into the space normally occupied by a tape cartridge. The transceiver cartridge takes power from the tape deck and transduces audio signals from the receiver into the tape deck through the magnetic head, and through the loud speakers. All that is required in the use of this transceiver cartridge is to connect an appropriate antenna to terminal 60 on the cartridge itself.

In a second method of operation, a radio antenna is coupled to the cartridge terminal 60 and a battery pack is plugged into the jack 62. The transceiver cartridge now becomes a self-sustaining and separately standing radio transceiver system, and can be carried to any position distant from the tape deck. The playout of the radio is by means of the hand held unit 15.

The transceiver receptacle 100, shown in FIGS. 6, 7, 8 is designed to facilitate the use of the transceiver in the second mode. The transceiver receptacle carries an extensible antenna, and batteries. Means are provided to insert the transceiver cartridge into the receptacle to automatically connect the antenna and power to the transceiver, so that it is immediately operable.

In a third mode of operation, a loud speaker can be plugged into the jack 64 and the device now becomes an audio amplifier loud speaker system or public address system utilizing the microphone in the unit 15 and utilizing the battery pack or the transceiver receptacle for power, and the loud speaker plugged into the jack 64 and utilizing the audio circuits of the radio receiver.

This describes a multi-purpose radio transceiver and receptacle which can be utilized in a plurality of circumstances to do a plurality of separate activities.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled. I claim:

1. In a communication system including a cartridge tape deck means including power supply and loud speakers, and including a radio transceiver cartridge means adapted for use in conjunction with said tape deck means utilizing said power supply and said loud speakers; and wherein said transceiver cartridge means comprises
   a. a housing including a first part of the shape and size of a conventional tape cartridge adapted to be inserted into said tape deck; and a second part of selected dimensions extending to the front of said tape desk;
   b. a plurality of openings in the end of said first part including:
      1. a first opening including therein two contacts adapted to contact the conventional two contacts inside said tape deck, whereby power can be drawn from said conventional two contacts to power said transceiver;
      2. a second opening including therein magnetic transducer means for transducing magnetic signals into the pickup magnetic head in said deck;
      3. A third opening to provide clearance for the tape drive wheel in said deck;
   c. radio transceiver means in said housing;
   d. control means for said transceiver means;
   e. microphone/loud speaker means connected to said transceiver cartridge means; and
   f. means to connect antenna means to said transceiver cartridge means, and including
   g. means in said cartridge tape deck means to apply power to said transceiver cartridge means, whereby when said radio transceiver cartridge means is inserted into said tape deck means and said antenna means is connected, said transceiver cartridge means receives power from said tape deck means and plays out through said loud speakers, and when said transceiver cartridge means is removed from said tape deck, and separate power is supplied, said transceiver cartridge means can be used independently of said tape deck means; and further including
   h. a transceiver cartridge receptacle means into which said transceiver cartridge means can be inserted; and including in said transceiver cartridge receptacle means:

1. batteries; and
2. extensible antenna means.

2. The communication system as in claim 1 including switch means responsive to the position of said transceiver cartridge means in said tape deck means to disconnect said loud speaker in said microphone/loud speaker means.

3. The communication system as in claim 1 including means inside said transceiver cartridge means and in said transceiver cartridge receptacle means to:
   a. connect said batteries in said transceiver cartridge receptacle means to the power circuit in said transceiver cartridge means; and
   b. connect the antenna lead in said transceiver cartridge means to said extensible antenna means in said transceiver cartridge receptacle means.

4. The communication system as in claim 1 including AC power means to provide operating power for said transceiver cartridge means.

5. A communication system which can be used alternatively in two sub-combinations comprising, in combination;
   A. cartridge tape deck means adapted to be fixedly installed in a selected location, such as a vehicle, and including:
      1. a first housing including a first insertion cavity for insertion of a standard tape cartridge;
      2. pickup magnetic head tape reading means;
      3. magnetic tape drive means;
      4. first electrical contact means carrying an electrical potential of selected magnitude;
   B. portable radio transceiver cartridge means adapted for use in one subcombination in conjunction with said cartridge tape deck means, comprising;
      1. a second housing including a first part of the shape and size of a conventional tape cartridge, adapted to be inserted into said first insertion cavity of said tape deck; and a second part of selected dimensions extending to the front of said tape deck;
      2. a plurality of openings in the end of said first part including:
         a. a first opening including therein second contact means adapted to contact the conventional two contacts of said first electrical contact means inside said tape deck, whereby power can be drawn from said electrical potential to power said transceiver cartridge means;
         b. a second opening including therein magnetic transducer means for transducing magnetic signals into said pickup magnetic head tape reading means in said cartridge tape deck means;
         c. a third opening to provide clearance for said magnetic tape drive means in said tape deck;
      3. radio transceiver means in said first housing;
      4. control means for said transceiver means in said second part;
      5. microphone/loud speaker/switch means connected to said transceiver cartridge means;
      6. internal antenna plug means in said transceiver cartridge means to connect to antenna jack means in a transceiver cartridge receptacle means;
      7. external jack means to connect to external antenna plug means; and
   C. portable radio transceiver cartridge receptacle means adapted for use with said transceiver cartridge means in a second subcombination, comprising;
      1. a third housing including a second insertion cavity for insertion of said first part of said second housing;
      2. power supply means in said third housing, and third electrical contact means connected to said power supply means, adapted to be contacted by said second contact means, when said transceiver cartridge means is inserted into said second insertion cavity;
      3. extensible antenna means connected to internal antenna jack means adapted to plugged into by said internal antenna plug means of said transceiver cartridge means;
   whereby when said radio transceiver cartridge means is inserted into said first insertion cavity and an antenna is connected to said external jack means, said transceiver cartridge means receives power from said tape deck means, and said transceiver cartridge means operates through said pickup head tape reading means and said loud speakers of said tape deck means; and
   whereby when said radio transceiver cartridge means is alternately inserted into said second insertion cavity of said portable transceiver cartridge receptacle means, said transceiver cartridge means receives power from said power supply means, and operates through the loud speaker in said microphone/loud speaker/switch means.

6. The communication system as in claim 5 including switch means in said transceiver cartridge means responsive to its insertion into said first insertion cavity to disable the loud speaker in said microphone/loud speaker/switch means.

7. The communication system as in claim 5 in which said power supply means in said transceiver cartridge receptacle means comprises batteries.

8. The communication system as in claim 5 in which said power supply means in said transceiver cartridge receptacle means is adapted to be connected to A.C. power means and includes rectifier means.

* * * * *